United States Patent [19]
Jones et al.

[11] Patent Number: 5,071,652
[45] Date of Patent: Dec. 10, 1991

[54] METAL OXIDE HYDROGEN BATTERY HAVING IMPROVED HEAT TRANSFER PROPERTIES

[75] Inventors: Kenneth R. Jones, Oconomowoc; Paul J. Kaprelian, Racine, both of Wis.

[73] Assignee: Globe-Union Inc., Milwaukee, Wis.

[21] Appl. No.: 625,560

[22] Filed: Dec. 11, 1990

[51] Int. Cl.$^5$ ............................................. H01M 12/08
[52] U.S. Cl. ....................................... 429/101; 429/120
[58] Field of Search ................. 429/101, 27, 176, 185, 429/34, 35, 163, 52, 48, 120

[56] References Cited

U.S. PATENT DOCUMENTS

| | | |
|---|---|---|
| 2,914,595 | 11/1959 | Darland, Jr. et al. |
| 4,098,962 | 7/1978 | Dennison ............................. 429/72 |
| 4,107,395 | 8/1978 | von Ommering et al. ........... 429/21 |
| 4,115,630 | 9/1978 | von Ommering et al. ........... 429/72 |
| 4,683,178 | 7/1987 | Stadnick et al. ..................... 429/101 |
| 4,923,769 | 5/1990 | Jones et al. .......................... 429/101 |
| 4,957,830 | 9/1990 | Jones .................................... 429/101 |

OTHER PUBLICATIONS

SAE Technical Paper Series, "Design and Cost Study of A 15 kWh Hydrogen Nickel Oxide Battery for Photovoltaic Applications", Sindorf et al, Aug. 1985.

*Primary Examiner*—Anthony Skapars
*Attorney, Agent, or Firm*—Andrus, Sceales, Starke and Sawall

[57] ABSTRACT

A metal oxide-hydrogen battery including an outer pressure vessel that contains a plurality of cell modules disposed in side-by-side relations. Adjacent cell modules are separated by heat transfer members that transfer heat from the cell modules to the outer vessel. Each heat transfer member includes a generally flat body or fin which is disposed between adjacent cell modules and a peripheral flange which is located in contact with the inner surface of the pressure vessel. The width of each cell module is greater than the length of the flange so that the flange of each heat transfer member is out of contact with the adjacent heat transfer member. The flanges are constructed and arranged to exert an outward radial force against the pressure vessel. Tie bars serve to clamp the cell modules and heat transfer members together in the form of a stack which is inserted into the pressure vessel.

16 Claims, 1 Drawing Sheet

U.S. Patent    Dec. 10, 1991    5,071,652
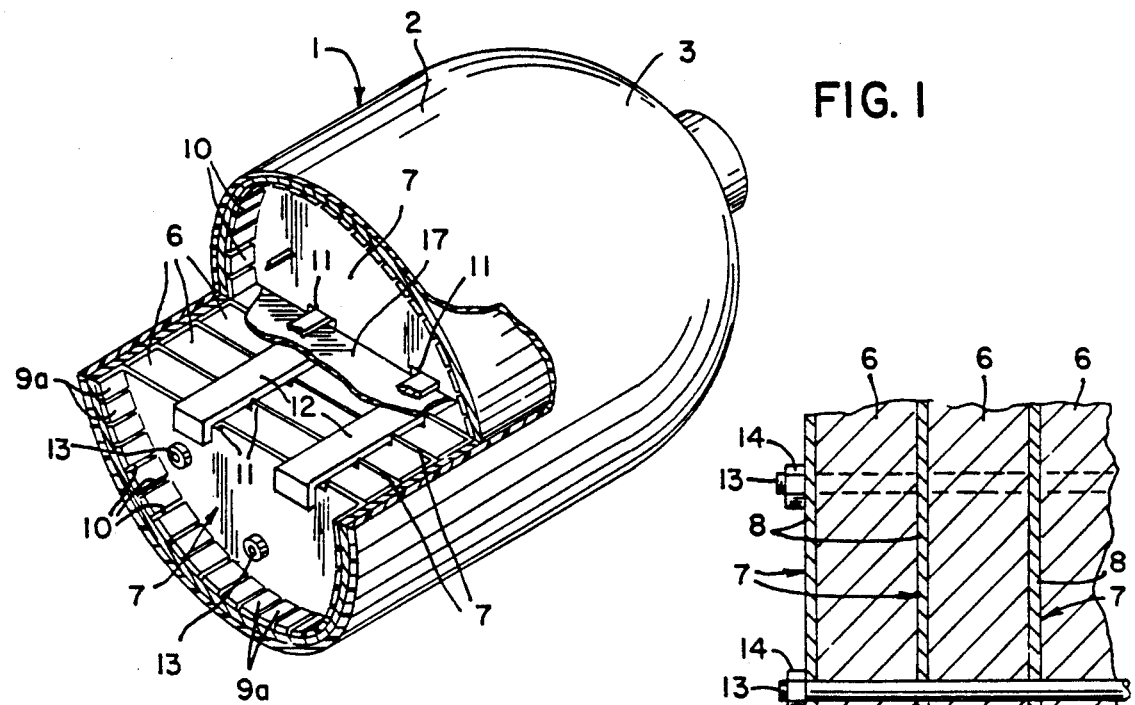
FIG. 1
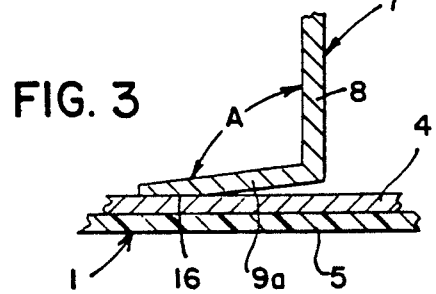
FIG. 3
FIG. 2
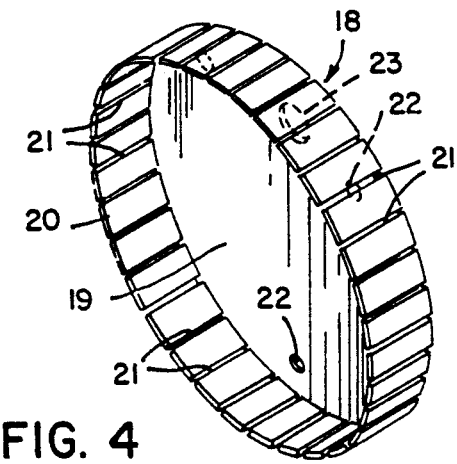
FIG. 4
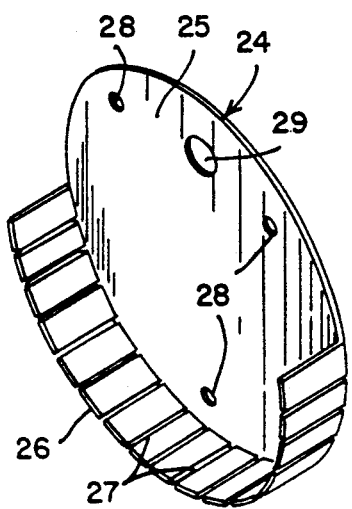
FIG. 5

METAL OXIDE HYDROGEN BATTERY HAVING IMPROVED HEAT TRANSFER PROPERTIES

BACKGROUND OF THE INVENTION

Metal oxide-hydrogen batteries, such as nickel oxide-hydrogen batteries have seen use as aircraft starter batteries and in aerospace applications because they are rechargeable, have extremely long cycle life and provide a uniform output during the entire discharge cycle.

In the typical nickel oxide-hydrogen battery, the battery cells are sealed in an outer pressure vessel that contains pressurized hydrogen gas. On discharge of the battery, the hydrogen gas diffuses through the electrolyte surrounding the catalyst surfaces of the negative plates and becomes disassociated to the mono-atomic form. The mono-atomic hydrogen is ionized and combines with hydroxyl ions to form water with an electron being released in the process of forming each hydrogen ion. In addition, hydroxyl ions are formed at the positive electrode by the reaction of water with the available oxygen content of the nickel oxide. As a result of these reactions an electron current is produced in the exterior circuit.

On recharging, the reaction is reversed, with the recharging being characterized by the regeneration of hydrogen at the negative electrode and the reoxidation of the nickel hydroxide at the positive electrode.

A nickel oxygen-hydrogen battery that contains a plurality or series of cell modules is commonly referred to as a common pressure vessel (CPV). In a CPV the individual cell modules are in the form of a side-by-side stack and as disclosed in U.S. Pat. No. 4,957,830 two stacks of semi-cylindrical cell modules are contained within the cylindrical pressure vessel. Alternately, the cell modules can be cylindrical or rectangular in configuration.

As described in the aforementioned patent, heat transfer plates or fins can be located between each pair of adjacent cell modules and act to transfer heat from the cell modules to the outer pressure vessel.

In the past the metal heat transfer fins have been integral with a semi-cylindrical shell, the fins being located between adjacent cell modules while the semi-cylindrical shell is in disposed in engagement with the inner surface of the pressure vessel. This type of heat transfer member has been traditionally formed by machining the shell and fins from a solid block of metal, or alternately individual fins have been brazed to the inner surface of the metal shell. In either case, the production of the heat transfe member has been extremely expensive and time consuming.

It is also important for effective heat transfer that the cell modules be in intimate contact with the flat heat transfer fins. With the machined or brazed construction as used in the past, the spacing between fins was fixed and the spacing was established to accommodate maximum tolerance of cell module thickness. Because of this, certain cell modules in the stack would not be in snug intimate contact with the fins which detracted from heat transfer to the outer pressure vessel.

As a result of expansion of the pressure vessel diameter due to internal pressure increases, a gap can occur between the heat transfer members, as used in the past, and the vessel wall. Such a gap could allow the stack of cell modules to collide with the vessel wall when the vessel is subjected to vibration or impact and possibly cause damage to either the cell modules or the vessel wall.

SUMMARY OF THE INVENTION

The invention is directed to an improved metal oxide hydrogen battery having an improved heat transfer properties. More particularly, the battery includes an outer pressure vessel which contains a plurality of cell modules which are stacked in side-by-side relation. Adjacent cell modules are separated by heat transfer members.

Each heat transfer member includes a generally flat body or fin, which is disposed between adjacent cell modules, and a peripheral flange which is positioned in contact with the inner surface of the pressure vessel.

The cell modules and heat transfer members are clamped together in the form of a stack by tie rods and the width of each cell modules is greater than the longitudinal length of the flange of the associated heat transfer member so that the outer extremity of each flange is spaced out of contact with the adjacent heat transfer member. This insures that when the cell modules and heat transfer members are drawn together in the form of a stack, the cell modules will be in snug intimate contact with the fins of the heat transfer members to insure effective heat transfer from the cell modules to the outer pressure vessel.

As a feature of the invention, the flange of each heat transfer member can be provided with a plurality of spaced longitudinal slits so that the segments of the flange located between slits are relatively flexible and will accommodate any out of roundness in the outer pressure vessel which is normally a drawn metal member. In addition the outer portion of the flange of each heat transfer member can be provided with a tapered surface so that when the stack is inserted within the pressure vessel the tapered surface will insure a substantial area of contact with the outer pressure vessel.

The invention insures that the cell modules will be in snug intimate contact with the adjacent heat transfer fins regardless of any variations in the width of the cell modules, thus providing a more effective heat transfer to the outer pressure vessel.

As a further advantage, the heat transfer members are preferably formed as metal stampings and this provides a substantial cost reduction over heat transfer mechanisms as used in the past in which the fins were machined from a solid block or brazed to an outer semi-cylindrical shell.

The invention also enables the assembled stack of cell modules to be tested for performance before the stack is inserted and sealed in the pressure vessel. Thus if there are any malfunctions of the stack it can be corrected before the stack is inserted and sealed in the vessel.

Other objects and advantages will appear in the course of the following description.

DESCRIPTION OF THE DRAWINGS

The drawings illustrate the best mode presently contemplated of carrying out the invention.

FIG. 1 is perspective view with parts broken away showing a metal oxide hydrogen battery incorporating the heat transfer mechanism of the invention;

FIG. 2 is an enlarged fragmentary longitudinal section showing a group of cell modules and heat transfer members;

FIG. 3 is an enlarged fragmentary longitudinal section showing a heat transfer member in contact with the outer pressure vessel;

FIG. 4 is a prospective view of a modified form of the heat transfer member; and FIG. 5 is a prospective view of a further modified form of the heat transfer member.

DESCRIPTION OF THE ILLUSTRATED EMBODIMENT

FIG. 1 illustrates a rechargeable metal oxide-hydrogen battery, such as a nickel oxide-hydrogen battery. The battery is composed of an outer pressure vessel 1 that includes a generally cylindrical shell 2, the open ends of which are enclosed by generally dome shaped heads 3. Pressure vessel 1 can be formed of an inner metal liner 4, formed of a metal such as Inconel, and the liner can be enclosed by a layer 5 of fiber reinforced resin that can be wound around the metal liner by a conventional filament winding process.

As shown in FIG. 1, two stacks of cell modular 6 are located within pressure vessel 1. The cell modules 6 of each stack are generally semi-cylindrical in shape and are disposed in side-by-side relation. The cell modules can be constructed as disclosed in U.S. Pat. 4,957,830 entitled Rechargable Metal Oxide Hydrogen Battery. As disclosed in the aforementioned patent, each cell module can be composed of a pair of back to back positive electrodes spaced apart by a separator layer, along with a pair of negative electrodes, each disposed adjacent and separated from a positive electrode. The positive electrodes are in the form of flat, porus, sinterel metal plaques impregnated with nickel hydroxide, while the negative electrodes are in the form of fine mesh nickel screens having a catalyst, such as platinum black, bonded to one surface of the screen through a hydrophobic polymeric material. An electrolyte, such as potassium hydroxide solution, is impregnated into the fiber separator layers that separate the electrodes. The modules can be connected together either in series or in parallel relation to obtain the desired voltage output.

Adjacent cell modules 6 of each stack are separated by heat transfer members 7. Each heat transfer member includes a generally flat fin or body portion 8 which is semi-circular in configuration and is located between adjacent cell modules. In addition each member 7 includes a peripheral flange 9 which extends longitudinally from the fin or body 8. Flanges 9 are in contact with the metal liner 4 of pressure vessel 1.

Heat transfer members 7 are formed of a material having a high coefficient of thermal conductivity. The cell modules are sealed, to prevent bridging of the electrolyte between cell modules, and the heat transfer members 7 can be composed of a metal, such as aluminum or beryllium-copper, or can be composed of carbon fibers.

The cylindrical shell portion of metal liner 4 is normally formed by drawing process and as a result the shell may not be precisely cylindrical but may be somewhat out of round. Because of this, flanges 9 can be formed with a plurality of circumferentially spaced slits 10. The segments of the flange located between adjacent slits 10 are relatively flexible which enables the flange to accommodate shells of the metal liner 4 which may be slightly out of tolerance.

Shown in FIG. 1, the chordwise edge of each heat transfer fin 8 is formed with a pair of notches or cut outs 11 and conductor bars 12 which are electrically connected to the terminals of the cell modules 6 extend through the notches 11. The connection of the conductor bars 12 to the cells can be similar to that described in U.S. Pat. No. 4,957,830.

The cell modules 6 and heat transfer members 7 of each semi-cylindrical stack are clamped together by a plurality of tie rods 13. The heads of the tie rods 13 bear against the end heat transfer member 7 and the tie rods extend through aligned holes 15 in the fins 8. The peripheral edge of each cell modules 6 is notched to receive the tie rods 13. The opposite end of each tie rod 13 is threaded and receives a nut 14, as shown in FIG. 2. By threading down the nuts 14 the heat transfer members are drawn together to provide a snug intimate contact between cell modules 6 and the fins 8.

As shown in FIG. 2 the outer extremity of each flange 9 is spaced from the fin 8 of the adjacent heat transfer member. This spacing insures that as the nuts are threaded down on the tie rods 13, the cell modules will be in snug contact with the fins 8. The rods 13 can be connected to an internal weld ring, not shown, that is employed to weld the abutting ends of the shell and head of the metal liner 4. By connecting the rods 13 to the weld ring, axial shifting of the cell module stack is prevented.

To improve the heat transfer between flanges 9 and metal liner 4, the outer surface of each flange 9 is tapered, as indicated by 16, and the tapered surface provides an increased area of contact between the flange 9 and liner 4 to improve the heat transfer to the metal liner. As formed and before assembly within the pressure vessel 1, the segments 9a of flange 9 between slits 10 extend at a an obtuse angle A with respect to the fin 8. When the stack of cell modules 6 and heat transfer members 7 is subsequently inserted in the pressure vessel 1, the segments 9a will be deflected or deformed inwardly and the flexible nature of the segments will exert a radial force or biasing action to maintain the segments in tight engagement with liner 4.

In assembly of the battery, the cell modules 6 and heat transfer members 7 are initially stacked in side-by-side relation on the tie rods 13. After assembly of the stack, the nuts are threaded down on the ends of the tie rods 13 forcing the cell modules 6 into tight intimate contact with the fins 8 of the heat transfer members. Conductor bars 12 can then be connected to the terminals of the cell modules and in this condition the battery can be tested for performance. If the testing proves satisfactory, the entire semi-cylindrical stack can then be inserted into the pressure vessel 1. As disclosed in U.S. Pat. No. 4,957,830, a biasing member, such as a resilient layer 17, can be inserted between the abutting chordwise edges of the two stacks of cell modules to urge the stacks outwardly toward the wall of the pressure vessel 1.

FIG. 4 shows a modified form of the heat transfer members which can be utilized with cell modules of cylindrical configuration. In this embodiment heat transfer members 18, which separate the cell modules include a generally circular flat fin or body 19 and a peripheral flange 20 extends outwardly from the fin. As in the case of the first embodiment, flange 20 can be provided with a plurality of spaced longitudinal slits 21.

As shown is FIG. 4, fin 19 is provided with a series of holes 22 through which tie rods, similar to tie rods 13, extend when the heat transfer members and cell modules are clamped together. In addition, the fin 19 is provided with an opening 23 through which receives a conductor bar, similar to conductor bar 12 of the first embodiment, that serves to interconnect the terminals on the various cell modules.

FIG. 5 shows a further modified form of the invention in which the heat transfer member 24, similar in function to heat transfer member 7 and 18, includes a generally circular body portion or fin 25 and a semicylindrical flange 24 extends longitudinally from the peripheral edge of the fin 25. As in the case of the earlier embodiments, flange 26 can be provided with a plurality of longitudinally extending, spaced slits 27 which provide a degree of flexibility for the segments of the flange between slits to accommodate a metal liner 4 which may be slightly out of round.

Fin 25 is provided with a series of holes 28 which receive tie rods, similar to tie rods 13, and the fin is also provided with an opening 29 to receive a conductor bar, similar in operation and construction to conductor bar 12.

With the construction of the invention, the opposed surfaces of the cell modules 6 will always be in snug intimate contact with the fins of the heat transfer members to provide a more effective transfer of heat from the cell modules to the metal liner 4. In addition to improving the heat transfer to the vessel wall, the flanges 9, 20 and 26 also serve to prevent damage to cell components due to vibration or shock. As a result of the expansion of the pressure vessel diamter during pressure increase, or due to tolerances or liner out-of-roundness, a gap can exist between the heat conductor and the vessel wall. When subjected to an external vibration or shock, such a gap could allow the internal cell module assembly to collide with the vessel wall and possibly cause damage to either the module assembly or vessel liner. The slit flanges of the heat transfer members serve to prevent such a collision by exerting an outward radial force against the metal liner that is greater than the force imposed by the vibration or shock. By adjusting the angle of the flange and using a material with the appropriate tensile strength or heat treated condition, the outward force of the flange can be tailored to meet a given vibration environment.

The heat transfer members 7, 18 and 24 are preferably metal stampings, and as such, are considerably less expensive then a machined or brazed heat transfer fins as employed in the past.

After assembly of the cell modules and heat transfer members, into stacked relation and connection of the conductor bars to the cell terminals, the stack can be tested for performance and any necessary changes can then be made before the stack is inserted and sealed in the pressure vessel.

Various modes of carrying out the invention are contemplated as being within the scope of the following claims particularly pointing out and distinctly claiming the subject matter which is regarded as the invention.

We claim:

1. In a metal oxide hydrogen battery, an outer pressure vessel, a plurality of cell modules disposed in side-by-side relation in said vessel, a heat transfer member disposed between adjacent cells modules, each heat transfer member including a generally flat fin disposed between adjacent cell modules and a peripheral flange extending from the periphery of said fin and disposed in engagement with the inner surface of said pressure vessel, the width of said cell modules being greater than the longitudinal length of said flanges whereby the outer end of each flange is disposed out of contact with adjacent heat transfer members, and connecting means for connecting the cell modules and heat transfer members in side-by-side relations as a stack.

2. The battery of claim 1, wherein said pressure vessel includes a generally cylindrical metal liner, said flanges being disposed in contact with said metal liner.

3. The battery of claim 2, wherein said heat transfer members are composed of a material having a high coefficient of thermal conductivity.

4. The battery of claim 1, wherein each cell modules is semi-cylindrical in configuration and said fins are generally semi-circular in configuration.

5. The battery of claim 1, wherein each cell modules is generally cylindrical in configuration and each fin is generally circular in configuration.

6. The battery of claim 1, wherein each flange is provided with a plurality of generally longitudinal circumferentially spaced slits.

7. The battery of claim 1 wherein each flange is flexible and in the unrestrained state before assembly of the stack with said pressure vessel extends at an obtuse angle with respect to the corresponding fin.

8. The battery of claim 7, wherein the outer portion of each flange is provided with a tapered surface which is engaged with the inner surface of said pressure vessel.

9. In a metal oxide-hydrogen battery, an outer pressure vessel including a generally cylindrical metal shell, a plurality of cell modules dispose in said metal shell, a plurality of heat transfer members each including a generally flat fin disposed between each pair of adjacent cell modules and having a peripheral flange disposed in engagement with said metal shell, the width of said cell modules being greater than the length of the flanges of said heat transfer members whereby each flange is disposed out of contact with the adjacent heat transfer member, clamping means for clamping the cell modules and said heat transfer members together in side-by-side relations as a stack, and means for permitting said flange to follow radial expansion of said pressure vessel.

10. The battery of claim 9, wherein each cell modules is generally semi-cylindrical in shape and each fin is semi-circular in shape.

11. The battery of claim 9 wherein each cell modules is generally cylindrical in shape and each fin is generally circular in shape.

12. In a metal oxide-hydrogen battery, an outer pressure vessel, a group of cell modules disposed in side-by side relations in said pressure vessel, a plurality of heat transfer members, each heat transfer member including a generally flat fin disposed between adjacent cell modules and each heat transfer member including a peripheral flange extending generally longitudinally from the peripheral edge of each fin and disposed in engagement with the inner surface of said pressure vessel, each flange being provided with a plurality of longitudinally extending circumfrentially spaced slits, the width of each cell modules being greater than the length of each flange whereby the outer end of each flange is disposed out of contact with the adjacent heat transfer member, and clamping means for clamping the cell modules and heat transfer member in side-by-side relation as a stack.

13. The battery of claim 12, wherein each flange in the unrestrained state prior to assembly of said stack with said pressure vessel extends at an obtuse angle with respect to the corresponding fin, said flange exerting an outward radial force against said pressure vessel after assembly of said stack with said vessel.

14. The battery of claim 13, wherein the outer portion of each flange is tapered and is disposed in engagement with the inner surface of the pressure vessel.

15. The battery of claim 12, wherein said clamping means comprises at least one tie rod extending through aligned holes in the fins of said transfer members.

16. The battery of claim 1, wherein each flange is constructed and arranged to exert an outward radial force against said pressure vessel.

* * * * *